(12) United States Patent
Mani et al.

(10) Patent No.: US 11,568,435 B2
(45) Date of Patent: Jan. 31, 2023

(54) INTELLIGENT AND INTERACTIVE SHOPPING ENGINE

(71) Applicants: Nat Mani, San Jose, CA (US); Lali Nathan, San Jose, CA (US)

(72) Inventors: Nat Mani, San Jose, CA (US); Lali Nathan, San Jose, CA (US)

( * ) Notice: Subject to any disclaimer, the term of this patent is extended or adjusted under 35 U.S.C. 154(b) by 280 days.

(21) Appl. No.: 16/109,599

(22) Filed: Aug. 22, 2018

(65) Prior Publication Data

US 2019/0066140 A1 Feb. 28, 2019

Related U.S. Application Data

(60) Provisional application No. 62/548,733, filed on Aug. 22, 2017.

(51) Int. Cl.
*G06Q 10/06* (2012.01)
*G06Q 30/02* (2012.01)
*G06Q 50/18* (2012.01)

(52) U.S. Cl.
CPC ....... *G06Q 30/0222* (2013.01); *G06Q 10/067* (2013.01); *G06Q 50/188* (2013.01)

(58) Field of Classification Search
None
See application file for complete search history.

(56) References Cited

U.S. PATENT DOCUMENTS

| 5,887,271 | A | * | 3/1999 | Powell | G06Q 20/20 |
| | | | | | 235/383 |
| 8,214,313 | B1 | * | 7/2012 | Puskorius | G06Q 10/087 |
| | | | | | 706/28 |
| 9,483,789 | B1 | * | 11/2016 | Hanlon | G06Q 30/0631 |
| 9,911,290 | B1 | * | 3/2018 | Zalewski | G06Q 30/0633 |
| 11,182,810 | B1 | * | 11/2021 | Pandey | G06Q 30/0241 |

(Continued)

FOREIGN PATENT DOCUMENTS

| WO | 2015200732 A1 | 12/2015 | |
| WO | WO2018144897 A1 * | 8/2018 | G06F 3/14 |
| WO | WQ2018170595 A1 * | 9/2018 | G06Q 10/04 |

OTHER PUBLICATIONS

Greg Council, "Machine Learning AI vs Expert Systems AI | Why It's Better", https://www.parascript.com/blog/machine-learning-ai-vs-expert-systems-ai/, Parascript Blog, Mar. 29, 2018 (Year: 2018).*

(Continued)

*Primary Examiner* — Paul R Fisher
(74) *Attorney, Agent, or Firm* — Bachmann Law Group PC

(57) ABSTRACT

A highly immersive, interactive and addictive platform for shopping. The system may provide both an online and retail experience through an immersive environment that enables repeat transactions and enables add-on sales to offers that are completely unique for each customer. The interactive shopping experience generates one or more bundles to any actual or potential user purchase to create a dynamic and favorable shopping experience for the particular user. The bundles are customized for each user based on user history with a merchant, product data, and merchant data, In addition to customizing the bundles, the decision of whether or not to offer one or more bundles is made only confirming that the current time is desirable to make an offer of bundles to the particular user.

25 Claims, 17 Drawing Sheets

(56) References Cited

U.S. PATENT DOCUMENTS

| | | | | |
|---|---|---|---|---|
| 2004/0215524 | A1* | 10/2004 | Parkyn | G06Q 20/32 |
| | | | | 705/80 |
| 2005/0198175 | A1* | 9/2005 | Thomas | H04L 51/063 |
| | | | | 709/206 |
| 2005/0228757 | A1* | 10/2005 | Sun | G06Q 50/188 |
| | | | | 705/80 |
| 2007/0239560 | A1 | 10/2007 | McGuire et al. | |
| 2007/0276730 | A1* | 11/2007 | Lee | G06Q 40/04 |
| | | | | 705/14.27 |
| 2013/0013385 | A1* | 1/2013 | Mesaros | G06Q 30/0267 |
| | | | | 705/14.25 |
| 2015/0324881 | A1 | 11/2015 | Ouimet | |
| 2016/0180421 | A1* | 6/2016 | Wegner | G06Q 50/188 |
| | | | | 705/80 |
| 2017/0046732 | A1* | 2/2017 | Elmachtoub | G06Q 30/0256 |
| 2017/0278173 | A1* | 9/2017 | Ettl | G06Q 30/0631 |

OTHER PUBLICATIONS

Fangru Wang and Catherine L. Ross, "Machine Learning Travel Mode Choices: Comparing the Performance of an Extreme Gradient Boosting Model with a Multinomial Logit Model" Journal of the Transportation Research Board, 2018 (Year: 2018).*

Rajan Gupta, Chaitanya Pathak, "A Machine Learning Framework for Predicting Purchase by Online Customers based on Dynamic Pricing", Procedia Computer Science, vol. 36, 2014, pp. 599-605, ISSN 1877-0509, https://doi.org/10.1016/j.procs.2014.09.060 (Year: 2014).*

* cited by examiner

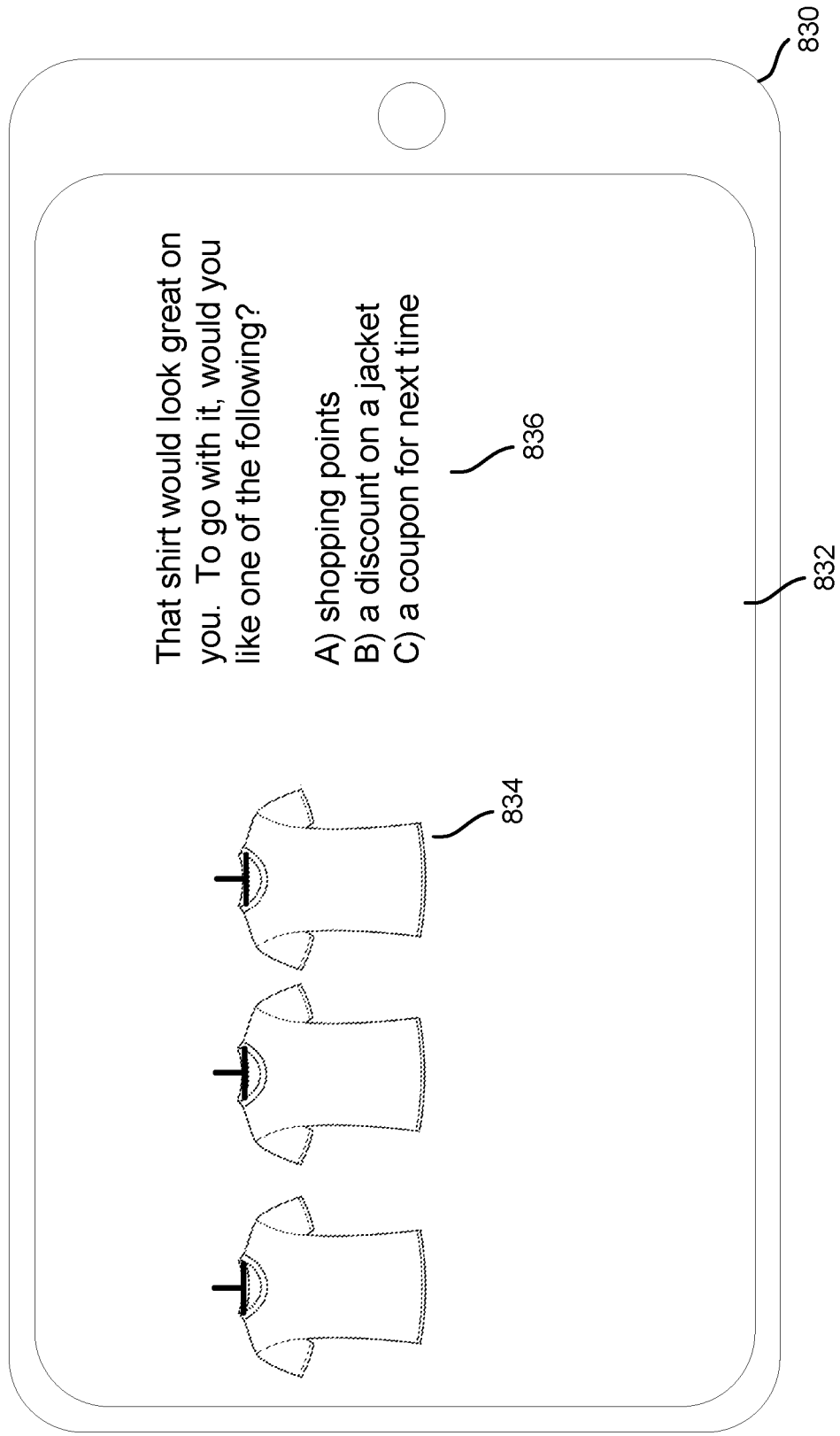

INTELLIGENT AND INTERACTIVE SHOPPING ENGINE

CROSS REFERENCE TO RELATED APPLICATIONS

This application claims the priority benefit of U.S. Provisional Application Ser. No. 62/548,733, titled "Intelligent and Interactive Shopping Engine," filed Aug. 22, 2017, the disclosure of which is incorporated herein by reference.

BACKGROUND

When purchasing some product, some shoppers purchase items online rather than taking the time to look at an item in person at a brick and mortar store having a physical location. With other products, some shoppers prefer to go inside a physical store to look at a product in person before purchasing it. Typical online shopping experiences allow a user to browse one or more products, select those products for purchase, and complete the purchase. A shopping experience at a physical storefront is similar, but items for sale that are seen in person are often not as easy to find and many products may out of stock—and therefore unavailable for viewing. Some merchants offer a coupon towards a product and offers sales to all customers on an equal basis.

Shopping online and through brick-and-mortar store is generally a very static experience. A user finds a product they are looking for, takes it to a virtual or physical checkout, and purchases the product. With the development of online shopping, there is often very little incentive for a user to come back to a particular retailer, and most online shopping experiences as well as brick-and-mortar experiences become a search for the best price. What is needed is an improved shopping experience provided to users to encourage them to continue shopping at a particular merchant.

SUMMARY

The present technology, roughly described, provides a highly immersive, interactive and addictive platform for shopping. The system may provide both an online and retail experience through an immersive environment that enables repeat transactions and enables add-on sales to offers that are completely unique for each customer. The interactive shopping experience generates one or more bundles to any actual or potential user purchase to create a dynamic and favorable shopping experience for the particular user. The bundles can be customized for each user based on user history with a merchant, product data, merchant data, user's internet browser history, and system prompted questions to ascertain the interest of a user in particular items. In addition to customizing the bundles, the decision of whether or not to offer one or more bundles is made only confirming that the current time is desirable to make an offer of bundles to the particular user based on the probability the user may accept the offer or other user preferences such as the frequency with which they desire to receive offers. A bundle may include one or more products for sale, discounted or free shipping, discounts for the same or a different product, or a combination of these and other offers. Interactive real-time negotiations can target price but may also target the type of bundle, number of items in the bundle, or discount.

In addition to providing customized bundles at a desired time, the present system provides a buyer with the ability to negotiate one-on-one with the system on a real-time basis. The negotiation may be handled by logic of the present system based on bundled products, price, discount, shipping cost, reward points or bundle mix parameters. Price parameters may be set by a merchant, including an average price, maximum price, and minimum price for each item, as well as the expected number of items to be sold over a specific period of time. The present system can then combine multiple items and present an offer in a bundle, while meeting the price expectation of the merchant for individual items. Negotiations are not limited to just price—the user can negotiate for a different bundle combination or expand the bundle by adding more products or request reward points in lieu of a price discount—all such types of negotiations are possible using this technology.

The present technology may provide the bundles and negotiation experience in both on-line and in brick-and-mortar store environments. When a user is in a physical store, the present system can provide an augmented reality feature that allows a user to enter a geographical location, such as a merchant's store, and interact with custom animations and virtual placements of items for sale. The interactions, items for sale, and prices may be generated specifically for the user and may not be visible for any other individual and is unique to the user. When a user is online, for example via a merchant webpage, the user can view items of interest, interact with the sales engine to negotiate the type of bundle, or the cost of shipping, or a price or a discount or reward points, and purchase items in a unique, interactive, and addictive manner.

In an embodiment, the present technology includes a method for providing an intelligent shopping experience. User merchant data and product data are received from a merchant server by an application server. A bundling timing score related to whether to prepare a bundle for a user at the current time is generated. The bundle offer includes an item of interest to the user and a benefit. The system can then present, based on the bundle timing score, one or more bundles for the user, each of the one or more bundles generated from the user merchant data and the product data. One or more bundles are provided to the user, structured unique to a particular user based on user profile, merchant influenced options, and also based on the user's response to system prompted questions. The interaction of the user and the merchant is in all cases dynamic and it is programmatically executed

BRIEF DESCRIPTION OF THE FIGURES

FIGS. 8A-8F illustrates an augmented reality implementation for an intelligent an interactive shopping engine.

DETAILED DESCRIPTION

Figure 1:
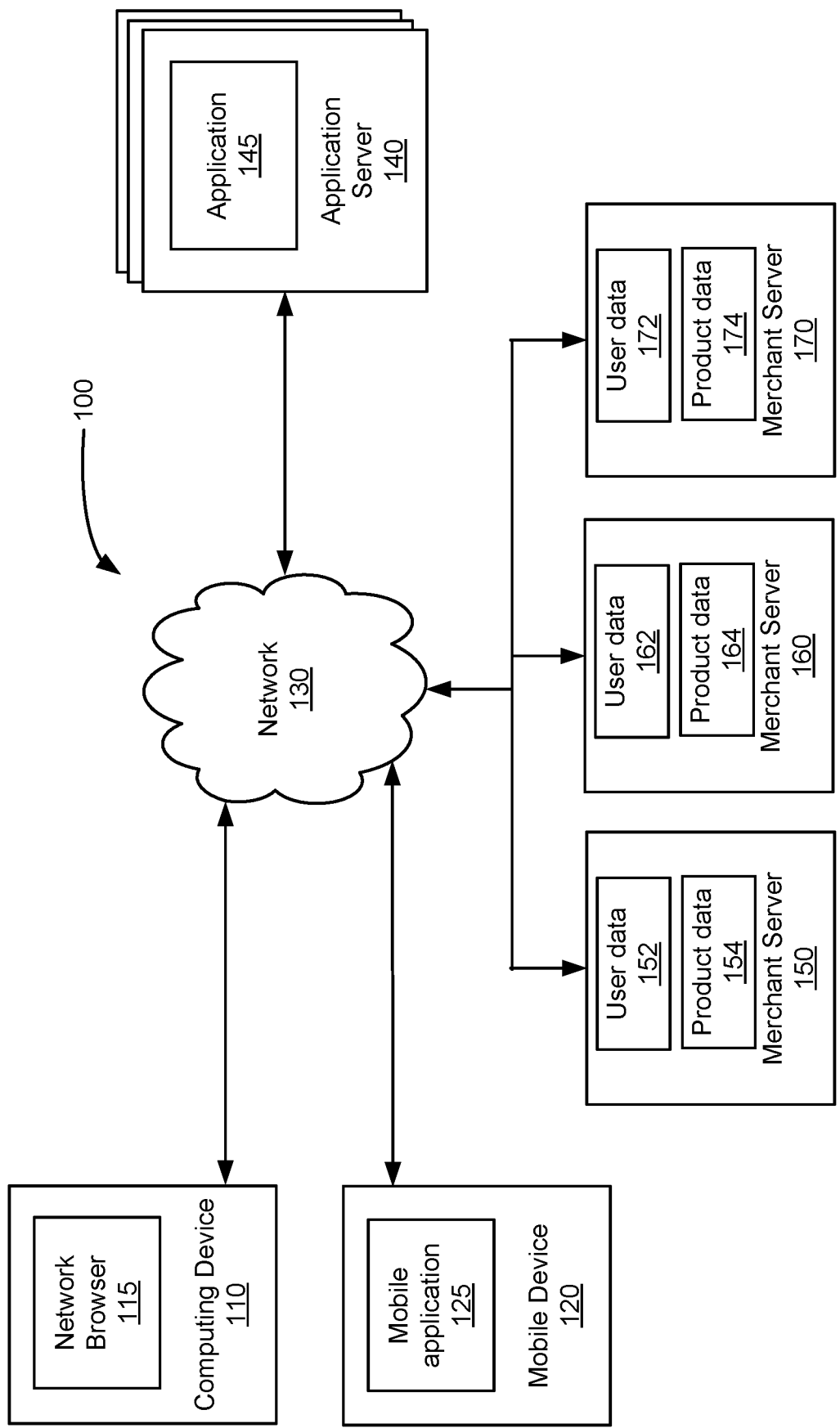
FIG. 1 is a block diagram of an intelligent an interactive shopping engine.

The present technology, roughly described, provides a highly immersive, interactive, personal and addictive platform for shopping. The system may provide both an online and retail experience through an immersive environment that enables repeat transactions and enables add-on sales to offers that are completely unique for each customer. The interactive shopping experience generates one or more bundles to any actual or potential user purchase to create a dynamic and favorable shopping experience for the particular user. The bundles are customized for each user based on user history with a merchant, product data, and merchant data, users' internet browsing history and based on system prompted questions to ascertain the interest of a user in particular items. In addition to customizing the bundles, the decision of whether or not to offer one or more bundles is made only confirming that the current time is desirable to make an offer of bundles to the particular user based on the probability the user may accept the offer or other user preferences such as the frequency with which they desire to receive offers. A bundle may include one or more products for sale, or a combination of a product plus free shipping, product plus reward points, product plus discounts for the same or a different product or such similar combinations. Interactive real-time negotiations may target price but may also target the type of bundle, number of items in the bundle, or discount.

In addition to providing customized bundles at a desired time, the present system provides a buyer with the ability to negotiate one-on-one with the system on a real-time basis. The negotiation may be handled by logic of the present system based on bundled products, price, discount, shipping cost, reward points or bundle mix parameters. Price parameters may be set by a merchant, including an average price, maximum price, and minimum price, as well as the expected number of items to be sold over a specific period of time. The technology will then have the ability to combine multiple items and present an offer in a bundle, while meeting the price expectation of the merchant for individual items. Negotiations are not limited to just price—the user can negotiate for a different bundle combination or expand the bundle by adding more products or request reward points in lieu of a price discount—all such types of negotiations are possible using this technology. In some instances, a particular merchant may provide user merchant data for that particular store as well as other merchants, for situations when a bundle may be provided to a user to offer a product or service from a different merchant.

The present technology may provide the bundles and negotiation experience in both on-line and in brick-and-mortar store environments. When a user is in a physical store, the present system can provide an augmented reality feature that allows a user to enter a geographical location, such as a merchant's store, and interact with custom animations and virtual placements of items for sale. The interactions, items for sale, and prices may be generated specifically for the user and may not be visible for any other individual and is unique to the user. When a user is online, for example via a merchant webpage, the user can view items of interest, interact with the sales engine to negotiate the type of bundle, or the cost of shipping, or a price, or a discount or reward points and purchase items in a unique, interactive, and addictive manner.

Decisions as to when to make a bundle offer to a user, the generation of the bundles, and negotiation activities are generated in a real-time basis based on the most up to date user merchant data, merchant data, and product data. For this reason, the bundles are well suited to provide the most value possible to both the user and the merchant behind the bundle offer.

FIG. 1 is a block diagram of an exemplary system for providing an intelligent and interactive shopping system. The block diagram of FIG. 1 includes computing device 110, mobile device 120, network 130, application server 140, and merchant servers 150-180.

Computing device 110 may include any device suitable for communicating with application server 140 over network 130, such as a desktop computer, a workstation, or any other computing device including devices that interact just using voice commands (such as Amazon Echo, Google Home, etc.). Computing device 110 may include network browser 115. Network browser 115 may be an application stored in memory of computing device 110, executed by one or more processors to receive, load, and output one or more content pages received from application 145, receive input through an input device computing device 110, and send data to application 145. In some instances, network browser 115 may be a web browser and provide web page content received over network 130, for example a webpage received from application server 140. The webpage content may be used to receive input and provide output according to functionality described herein.

Mobile device 120 may include a smart phone, laptop computer, tablet computer, or any other computer that may be considered mobile in nature. In some instances, device 120 and/or computing device 110 may each be implemented as any device—mobile or other—that can support virtual reality (VR) and augmented reality (AR) technology and provide and an AR or VR experience to a user. Mobile device 120 may also include a device that provides in-ear voice technology.

Mobile device 120 may include mobile application 125. Mobile application 125 may communicate with application 145 on application server 140 to implement functionality described herein.

Mobile application 125 may, for example, receive user input to and navigate through webpages provided by a merchant server or application server. Mobile application 125 may also collect geographical data for the location of the device and report that data to merchant server 150 and application server 140. Mobile application 125 may further provide an augmented reality (AR) experience when a camera of the mobile device is directed towards a product, display, or other portion of a physical store and the corresponding camera view as well as additional graphics, text, icons or other content is provided through display of mobile device 120. In some instances, mobile application 125 may be implemented as a mobile application compatible with an IOS or android operating system.

Network 130 may be used to communicate data between one or more machines, including computing device 110, mobile device 120, application server 140, video storage 150, training data 160, and training video 170. Network 130 may be implemented by one or more public networks, private networks, an intranet, the Internet, a wireless or Wi-Fi network, a cellular network, or any other network suitable for communicating data.

Application server 140 may communicate with devices 110-120 as well as servers 150-170. Application server 140 may include one or more machines that implement one or more physical or logical application servers. In some instances, application server 140 may include one or more machines that implement one or more physical or logical web servers (not illustrated in FIG. 1) that communicate with network 130 and one or more physical and/or logical application servers. Application server 140 may also communicate with one or more physical or logical data stores (not illustrated in FIG. 1) at which data including user merchant data, product data, and merchant data can be stored.

Application 145 may reside in memory of one or more application servers 140 and may be executed to provide functionality described herein. Application 145 may have logic and artificial intelligence functionality to determine individual pricing information for objects, negotiate and/or haggle item prices and bundles with a user, provide an augmented reality experience through mobile application 125, and may communicate with devices 110-120 to provide an interface to communicate with the user. Application 145 is discussed in more detail below with respect to the block diagram of FIG. 2.

Merchant servers 150-180 may each provide one or more products or items for sale through the system provided by application server 140. Each of merchant servers 150-170 may include user merchant data (152, 162, 172) and product data (154, 14, 174). User merchant data may include user purchases, online pages visited, clicks received for a user, merchant related geographical locations visited by the user, in-store purchases, a user shopping wish list, a number of shopping points accumulated for the user, and other data capable of being selected by a merchant when a user shops within a physical merchant store and/or accesses a web service provided by the merchant.

Product data may include product descriptions, including text and images, a minimum price and maximum price at which the product may be sold, the number of items expected to be sold over a period of time, the possible pairing of this item with another to create a bundle and other data. Product data may also include category data, such as the color, size, type of product, and other data. With this information, application server 140 may provide items of interest to users through computing device 110 or mobile device 120. The items provided to a user may be in response to a user search, items determined to be of interest to a user based on user purchase history and other data, and other items. In some instances, a merchant may provide a discount to a particular user without providing the same discount to other users, thereby potentially selling the product at a price which is more desirable to a merchant and on terms more agreeable to each individual purchaser. In some instances, a seller may only pay a fee to administrators of the present selling engine if there is a successful commercial transaction involving the merchant.

Merchant servers 150-170 may also include merchant data which may be provided to application server 140. The merchant data may include data such as minimum or average discount desire to provide a particular user, the time it product has been in inventory, preferred user qualities for particular discounts, desired revenue, desired margins, promotional investments, and other data.

Figure 2:
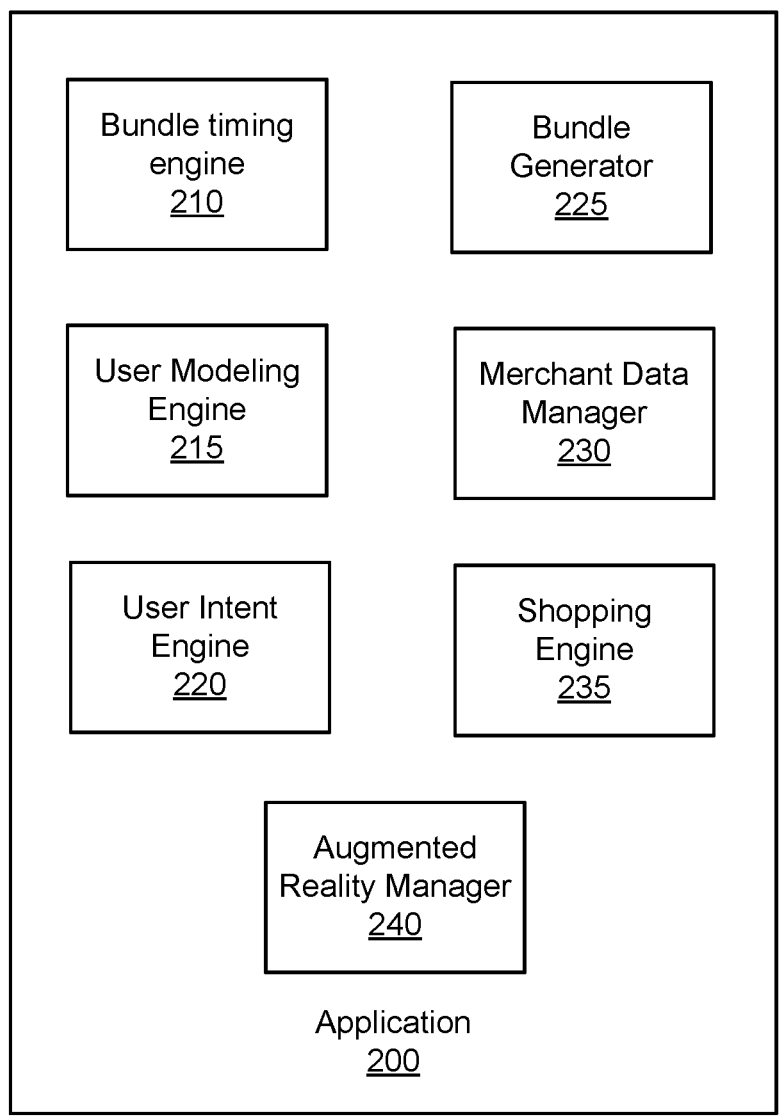
FIG. 2 is a block diagram of an application for providing an intelligent an interactive shopping engine.

FIG. 2 is a block diagram of an application for providing an intelligent and interactive shopping engine. Application 200 of FIG. 2 provides more detail of application 145 illustrated in FIG. 1. Application 200 includes bundle timing engine 210, user modeling engine 215, user intent engine 220, bundled generator 225, merchant data manager 230, shopping engine 235, and augmented reality manager 240.

Each module of application 200 may be executed to perform all or a portion of the functionality discussed herein. Though several modules are illustrated, one or more modules of FIG. 2 may be combined or divided into multiple modules. Additionally, the illustrated modules are intended to be exemplary, and other modules or configurations of code may be implemented to achieve the functionality described herein.

Bundle timing engine 210 may be executed to generate bundle timing scores. User modeling engine 215 may model user shopping history. By modeling the user shopping history, engine 215 can identify bundles that the user may be interested in. User intent engine 220 may determine a user's intent to complete a purchase at a particular time. The intent engine may generate an intent score or vector that, when compared to a threshold, may determine whether a user is likely to make a particular purchase.

Bundle generator 225 may generate one or more bundles to submit to a user. The bundle generator 225 may also include modeling, artificial intelligence, machine learned logic and other logic that may receive and process counteroffers to a particular bundle, determine if those counteroffers are acceptable, and accept or propose an alternative bundle to a user. Merchant data manager 230 may process and analyze merchant data. The merchant data may include discounts, inventory, shipping information, and other data.

Shopping engine 235 may generate, manage, and provide shopping information to a user, such as for example through a mobile application or web service provided by application 200. The shopping information may be provided directly to a user, through a mobile application or network content page (e.g., website) provided by application server 140 and displayed through a computing device (for example through computing device 110 or mobile device 120), or through a mobile app or content page provided by a particular merchant.

Augmented reality manager 240 may provide an augmented reality experience to a user through a user's mobile device. The augmented reality experience can be provided within a merchant's physical store or other location. In some instances, the augmented reality experience may direct a user to different portions of the store with graphical for textual icons or other information, provide bundles to a user, and otherwise interact with a user and provide additional rich content to the user.

Figure 3:
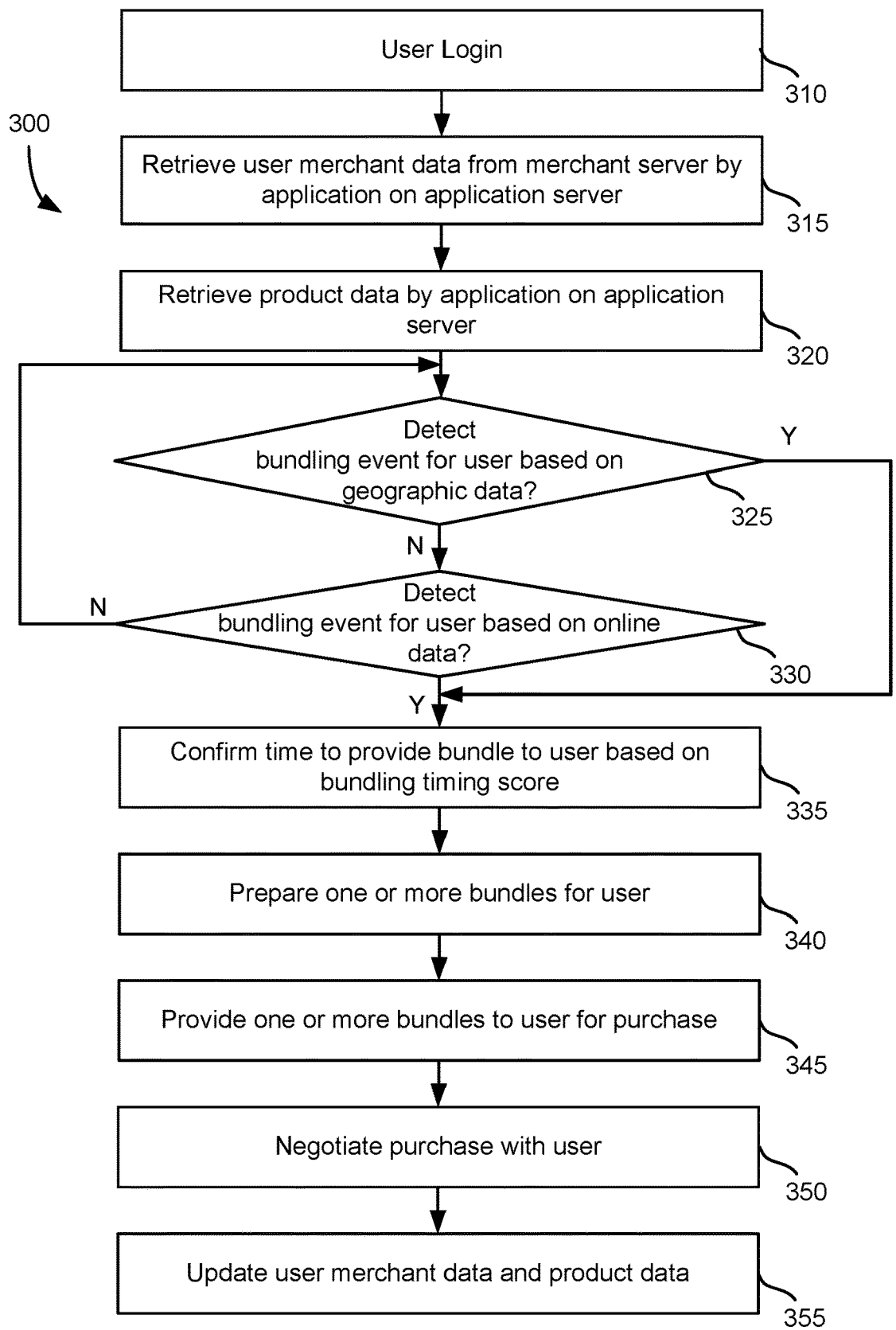
FIG. 3 is a method for providing an intelligent an interactive shopping engine.

FIG. 3 is a method for providing an intelligent an interactive shopping engine. A user logs in at step 310. User login may be broadly interpreted as creating a user account, executing a mobile application, logging into a web service, or simply determining that a user's physical location is detected at or near a brick-and-mortar store for a merchant.

User merchant data is retrieved from a merchant server by an application on an application server at step 315. The merchant data may include user purchase information, including online webpages visited, clicks received, and items bought. The user merchant data may also include in-store visit data, including visits to a store, items purchased, items returned, and other user merchant data. In some instances, the user merchant data may be for more than one merchant. For example, a particular merchant may provide user merchant data for that particular store as well as other merchants, for situations when a bundle may be provided to a user to offer a product or service from a different merchant.

Product data can be retrieved by an application on the application server at step 320. Product data can include inventory, information regarding related products, category information for a product, and other data.

After retrieving data, a determination may be made as to whether a bundling event is detected for a user based on geographic data at step 325. In some instances, user might make a visit to a physical brick-and-mortar store for the merchant. Mobile device on the user's phone may detect the user's location at the store, near the store (e.g., in or near a mall at which the store is located), and generate an event or notification message in response to detecting the user's location at the store. The bundling event may also be an actual purchase by the user at a physical store. If a bundling event is detected for user based on geographical data, the method of FIG. 3 continues to step 335.

If a bundling event is not detected based on geographical data, a determination is made as to whether a bundling event is detected for a user based on online data at step 330. Similar to visiting a physical store, a user may visit a website provided by the merchant and click on a particular product or service offer. That click, or visit of the particular page associate with the product, could trigger a bundling event for the user. Similarly, if a user exhibits a pattern while navigating online website pages that is similar to a previous pattern that resulted in a purchase through the website, that may also initiate a bundling event for the user. If an online bundling event is detected for the user, the method continues to step 335. Otherwise, the method continues to determine whether any bundling event is detected at step 325 and/or 330.

A confirmation of a time to provide a bundle to a user based on a bundling time score is made at step 335. Determining a bundling time score to confirm a time at which to potentially provide a bundle to a user may include determining if a current time (or other time) is a good time to offer the bundle. Generating the bundling time score may utilize user merchant data, and intent score, and other data. Generating a bundling timing score is discussed in more detail with respect to the method of FIG. 4.

One or more bundles are prepared for a user at step 340. The bundles may be prepared from user merchant history, product data, and merchant data. In some instances, initially, a user may be "boxed" or categorized similarly to other users having similar basic traits. As the set of user data modifies or the user performs additional shopping, the user shopping can be modeled in a more customized matter. As such, bundles prepared for user may be customized as well. More detail for preparing bundles for user is discussed with respect to the method of FIG. 6.

One or more bundles may be provided to the user for purchase at step 345. The bundles may be provided to user in whichever way the user is interacting with the merchant service. If the user is navigating a website, the merchant service may provide a network content page, for example a webpage, to provide the one or more bundles. If the user is shopping through a mobile app, bundles may be provided through the mobile app on a mobile device. If a user is navigating around a physical store, the bundles may be provided to a user through the mobile device in any of number of ways, including but not limited to information provided by a mobile app, an augmented reality experience through the mobile application, text message, a sales associate, or other mechanism.

An agent of the present system may negotiate a purchase with the user at step 350. A user may accept, reject, or provide a counter offer to any of one or more bundles provided to the user. In some instances, if one or more bundles provided to a user are not accepted by the user, the user or the agent may initiate a negotiation process in attempt to achieve a sale or purchase of a product. Negotiating a purchase with a user is discussed in more detail with respect to the method of FIG. 7.

Once the purchasing session with the user is complete, user merchant data and product data are updated at step 355. If a sale results, the merchant data is updated with the user's preferred product, bundles engaged or selected, and other data. The product data may be updated based on whether or not there was a sale on products in order to move inventory, the margin, and other product data.

Figure 4:
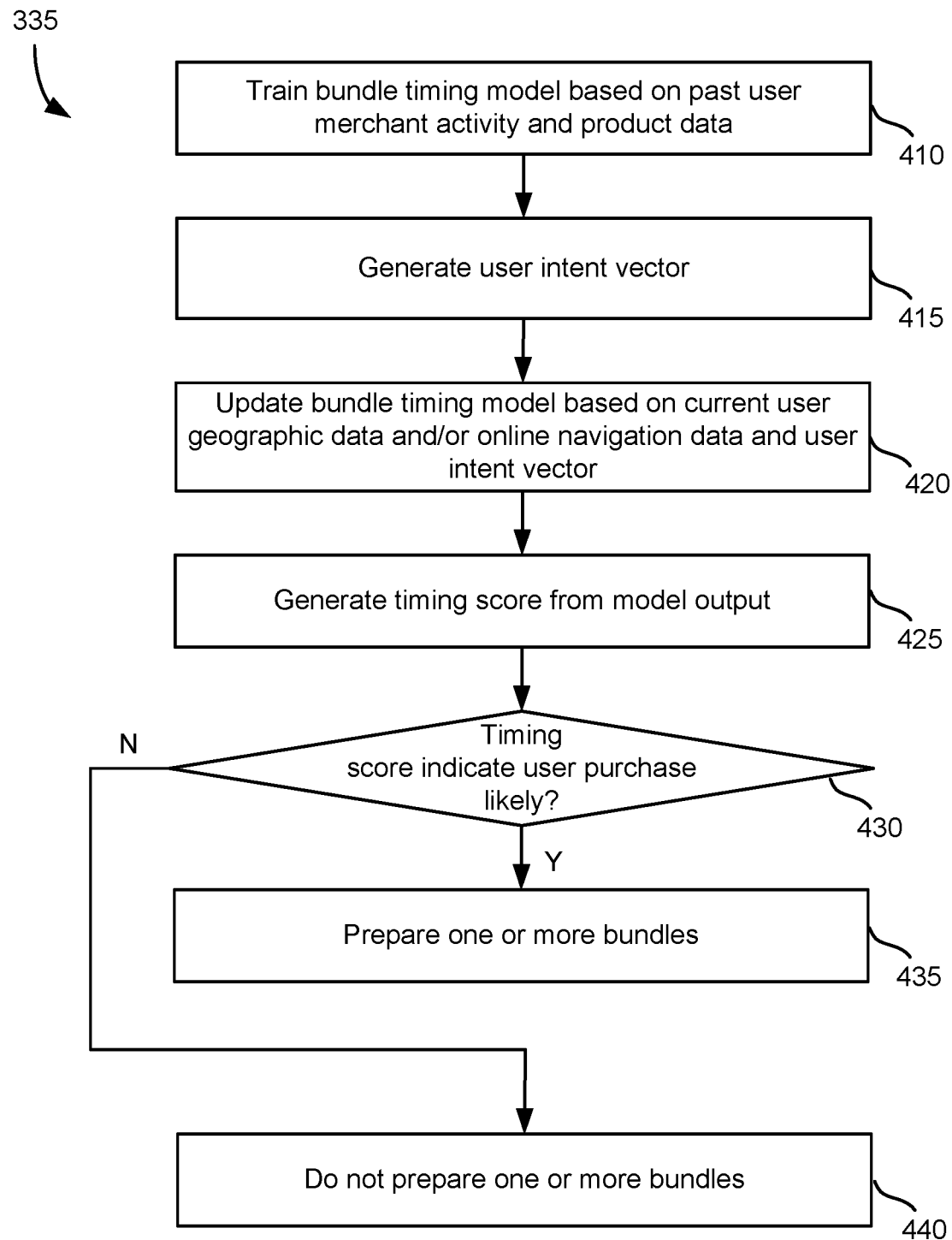
FIG. 4 is a method for confirming a time to provide a bundle.

FIG. 4 is a method for confirming a time to provide a bundle. The method of FIG. 4 provides more detail for step 335 of the method of FIG. 3. First, a bundle timing model is trained based on past user merchant activity and product data at step 410. The bundle timing model may be any of several types of modeling techniques which results in the likelihood of the user making a purchase at the current time based on the data received by the model. A user intent vector is generated at step 415. The user intent vector is intended to provide an indication of the user's intent to make a purchase or strike a deal with the service. More details for generating a user intent vector are discussed with respect to the method of FIG. 5.

The bundle timing model is updated based on the current user geographical data and/or online navigational data and the user intent vector at step 420. The model may then output timing information which may be translated into a timing score at step 425. A determination is then made as to whether the timing score indicates the user is likely to make a purchase at step 430 if presented with a bundle offer. If the timing score indicates the user is not likely to make a purchase, then the system determines that one or more bundles should not be prepared at step 440. If the time score indicates the user is likely to make it purchase if a bundle offer is presented, one or more bundles are generated at step 435.

Variations of the method for determining the timing to make a bundle are within the scope of the present technology. For example, in some instances, bundle offers are made if a user is close to making a purchase but not 100% committed to the purchase. In this way the bundle is used to increase conversion for the merchant.

Figure 5:
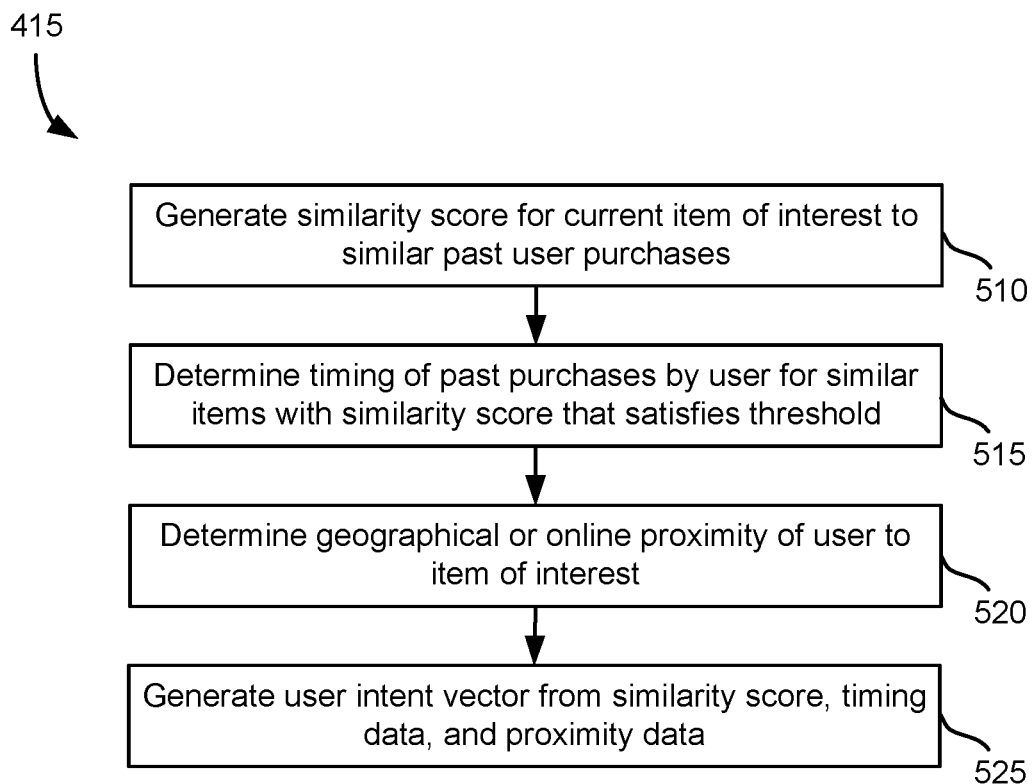
FIG. 5 is a method for generating a user intent vector.

FIG. 5 is a method for generating a user intent vector. The method of FIG. 5 provides more detail for step 415 of the method of FIG. 4. A similarity score is generated for the current item of interest to similar past user purchases at step 510. The similarity score may be based on the category of the current item and pass user purchases and rich profile information for the user and products. In some instances, the similarity score reflects what products go together or are typically purchased together by the current user or other users. A level of granularity for the products to go together may be, for example, a specific dress that matches a subset of shoes based on color and style. Similarly, the products that are purchased together may both be food type products, such as milk and bread. The correlation granularity may be for its population as a whole, maybe based on demographic or psychographic data, it may be generated for a clustered set of users or an individual user.

In some instances, a similarity score may be used to identify items other than products available for purchase. For example, a similarity score can be used to determine a number of points at which a user may be more likely to complete a purchase of an item of interest.

A timing of past purchases by the user for similar items having a similarity score that satisfies a threshold is determined at step 515. In some instances, this will determine if past purchases similar to the current item of interest have been purchased on a regular schedule or periodically by the user. If the determination identifies past purchases with a high similarity score to that satisfies a threshold, this will indicate that the user likely has an intent to purchase a product.

A geographical or online proximity is determined of the user to an item of interest at step 520. In other words, if a user enters the store and walks up to a particular product of interest, or goes online to the merchant website and navigates to a particular page having the product, this will be determined as a close proximity to the product and indicative of an intent to purchase a product.

A user intent vector is generated from the similarity score, timing data, and proximity data at step 525. User intent vector may be generated as a weighted product of each factor. In some instances, if a similarity score, timing data, or proximity data is very high, this might be considered more heavily than other factors which may not be as high.

Figure 6:
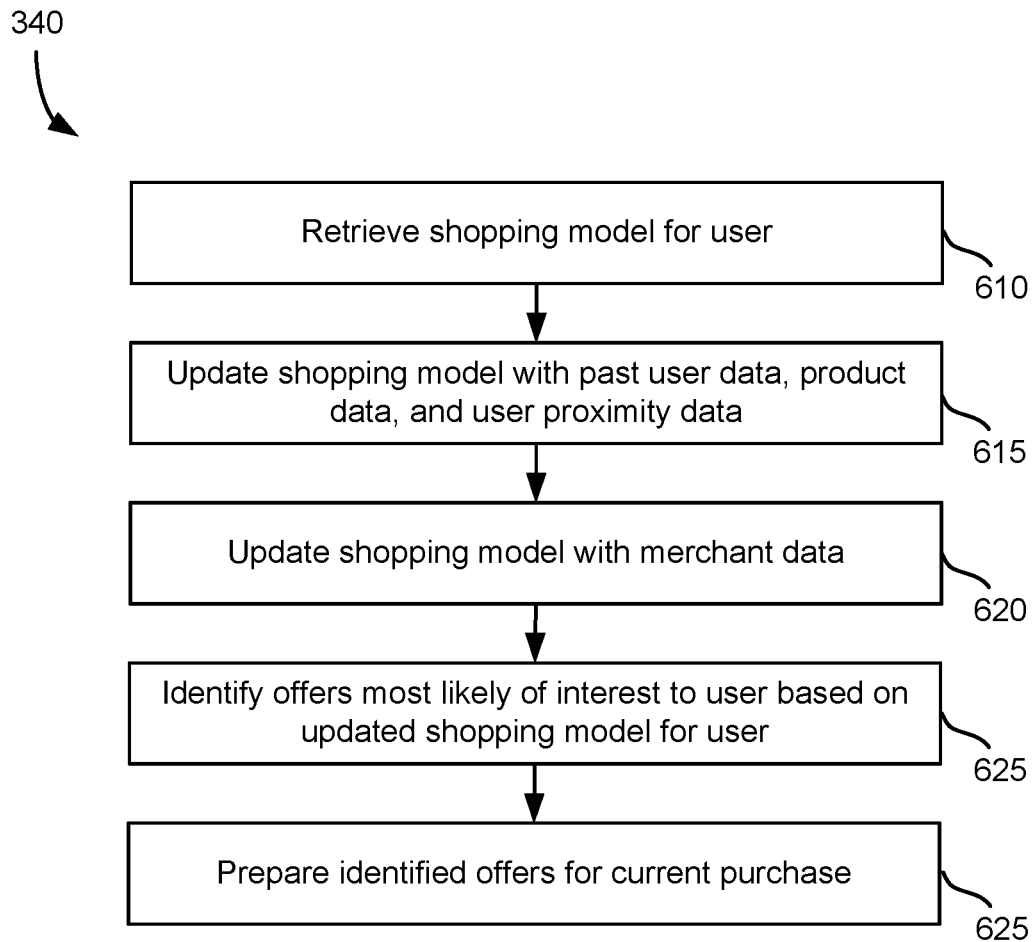
FIG. 6 is a method for preparing one or more bundles for a user.

FIG. 6 is a method for preparing one or more bundles for a user. FIG. 6 provides more detail for step 340 of the method of FIG. 3. First, a shopping model is retreat for the user. The shopping model may be retrieved for a group of users or the user individually, depending on the extent of the shopping history the user has. A shopping model may then be updated with past user data, product data, and user proximity data at step 615. A shopping model may be implemented using any type of modeling technique that allows for identifying bundles that would be decided by a user.

A shopping model may be updated with merchant data at step 620. The merchant data may include various targets by the merchant, including revenue, margin data, promotional investment, inventory movement requirements, and other data. Offers most likely to be of interest to the user based on the updated shopping model for the user are identified at step 625. Product similarity may include product set can be used or worn together or our commonly purchased together. The granularity of the product may be in terms of the item and/or category of the product. System may prepare identified offers for the current purchase at step 625. The offers may be generated according to what is determined to be most desirable to a user. Examples of offers that are bundled with a current item of interest for user are free shipping, discounts on other products, shopping points, products for other merchants, and other offers.

Figure 7:
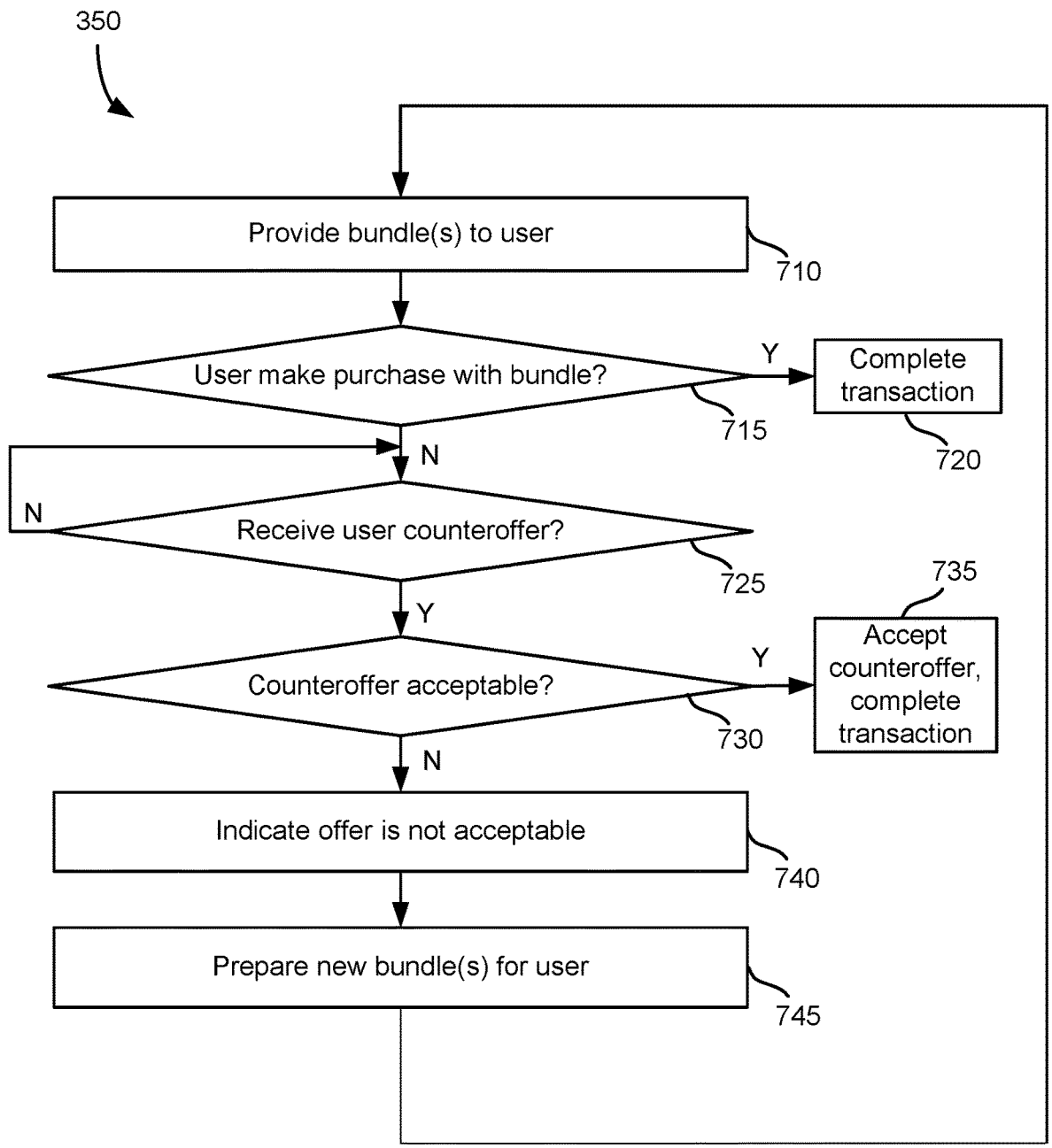
FIG. 7 is a method for negotiating a purchase between a user and an automated agent.

FIG. 7 is a method for negotiating a purchase between a user and an automated agent. The method of FIG. 7 provides more detail for step 350 of the method of FIG. 3. Bundles are provided to a user at step 710. The bundles may be provided to the user through a mobile app, text message, website, augmented reality experience through a mobile device, or in some other manner. A determination is made as to whether a user makes a purchase with a bundle at step 715. If the user purchases an item of interest with a particular bundle, the transaction is complete at step 720. If the offer is not accepted, a determination is made as to whether a counteroffer is received from the user at step 725. The counteroffer may be in one of several forms, including a request for multiple bundles, different terms for an existing bundle, or some other counteroffer. If no counter offer is received, the method stays at step 725.

In some instances, an entire negotiation set of bundles and/or individual offers is personalized and optimized for the user and is only known and available to the user. Therefore, the negotiation offers may not be available to other users or to the same user at a different time.

If a counteroffer is received, a determination is made as to whether the counteroffer is acceptable at step 730. In some instances, bundle generator 225 may include logic, including artificial intelligence, the may determine whether a counteroffer is acceptable. Determination is whether a counteroffer is acceptable may include whether it compliance with merchant margins, profits, allowed merchant promotions, and other parameters associated with the merchant and the product itself. If the counteroffer is acceptable, the counteroffers accepted in the transaction is completed at step 735. It's of counteroffer is not acceptable, and indications provided to the user that the offers unacceptable at step 740. In this case, additional or new bundles may be prepared and provided to the user at step 745, and the method of FIG. 7 returns the steps 710.

FIGS. 8A-8F illustrates an augmented reality implementation for an intelligent an interactive shopping engine. The AR implementation of FIG. 8A includes a physical store 800. The store includes shopping aisles 802, 804, 806, and 808. Shopping aisle 806 includes a first product 810. Shopping aisle 802 includes a second product 812. For purposes of discussion, the first product will be considered a shirt in the second product will be considered a jacket.

Figure 8A:
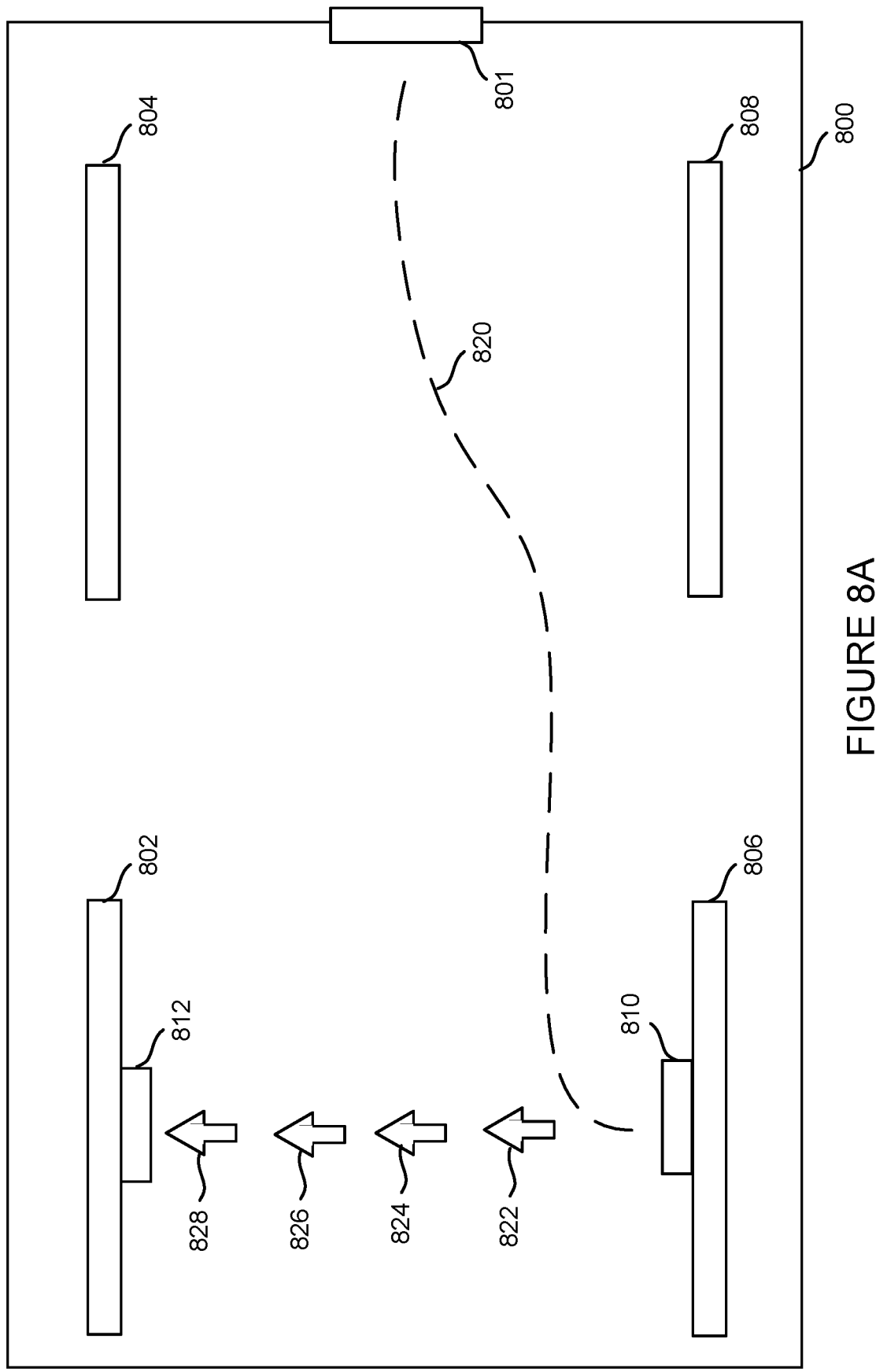
Figure 8B:
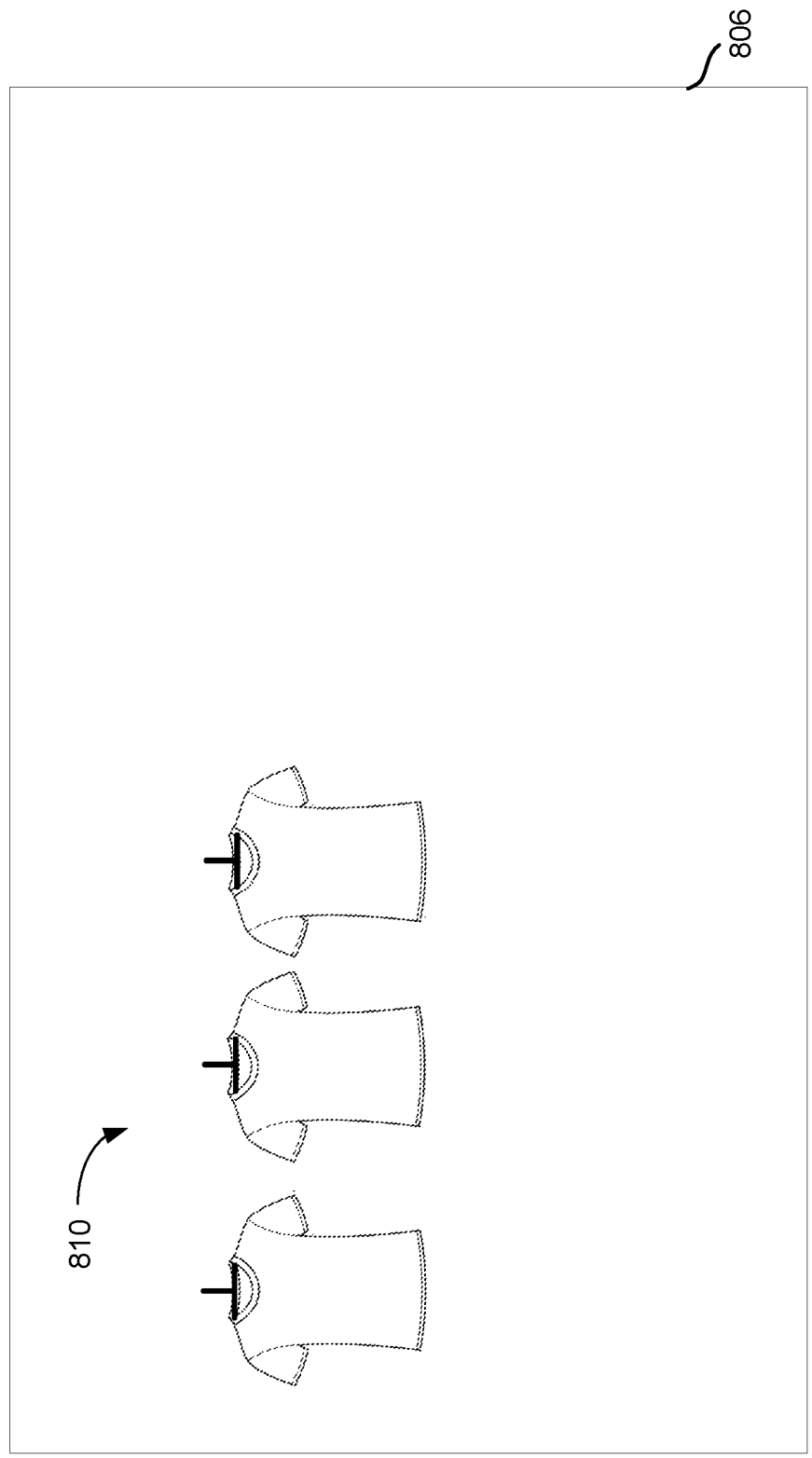
Figure 8D:
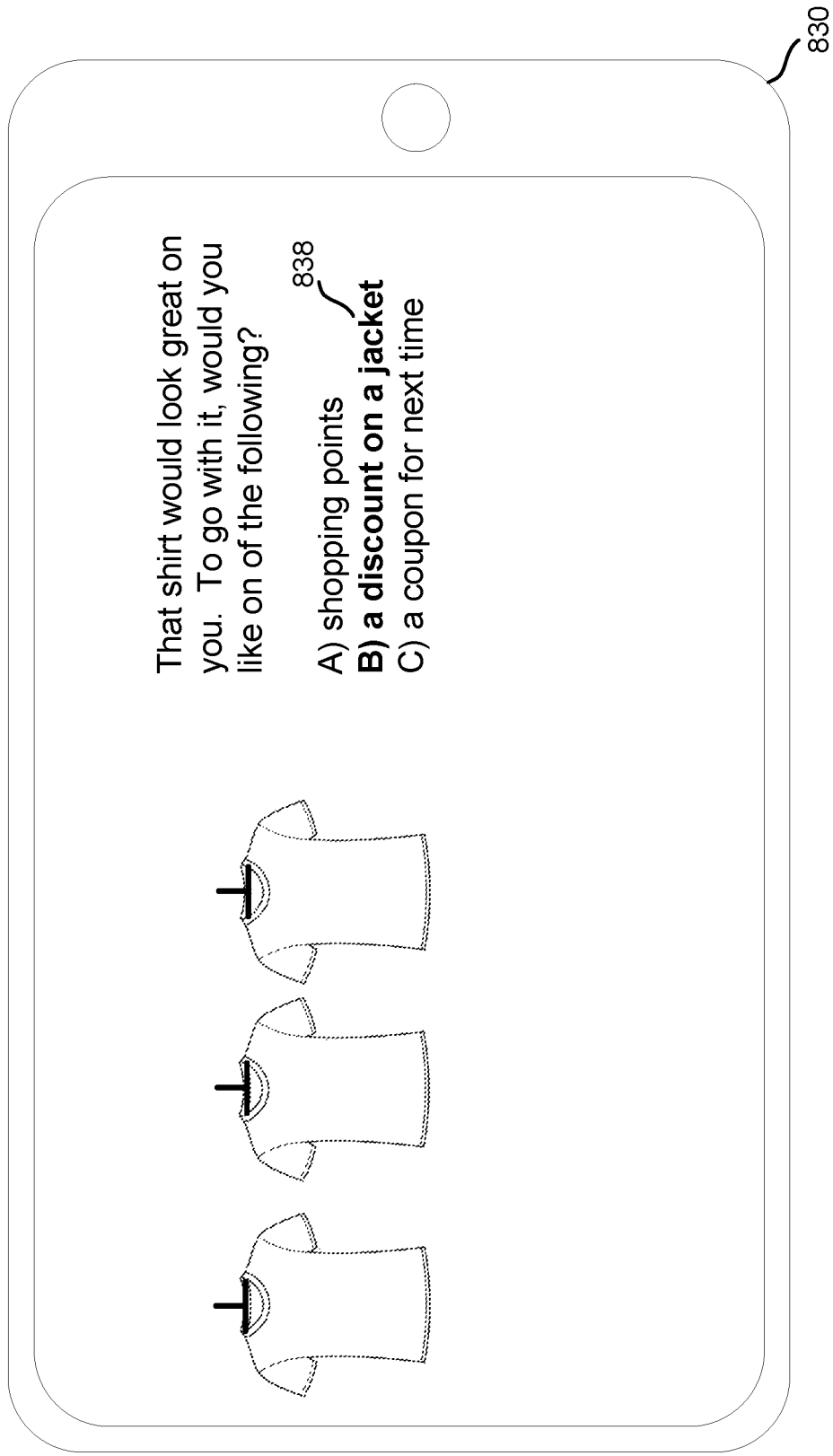

A user may enter the store through door 801. Once within the store, the user's mobile app may detect the geographical location of the user within the store, and send a notification to an application server of the user's geographical location. The user may follow a path 820 through the store and arrive at first product 810 at shopping aisle 806. FIG. 8B illustrates that isle 806 includes first products 810, consisting of one or more shirts hanging within the aisle. Once in front of the first product (shirt), the mobile app may send a notification of the user is currently in the vicinity of or dwelling near the location of the shirt. As a result, application server may determine that the user is likely to make a purchase at the current time if offered a bundle, and may therefore generate one or more bundles to be displayed to the user. The generated bundles may be provided to a user through an augmented reality experience via the user's mobile device (or other device with AR and/or VR capability). FIG. 8C illustrates the view through the display 832 of a mobile phone 830 of aisle 806 with first product 810 along with bundle data. The bundle data is provided as superimposed text that reads "that shirt with the great on you. To go with it, would you like one of the following?". The bundles are then specified as "a) shopping points," "be) a discount on a jacket," "C) a coupon for next time." The bundles may be illustrated as text, graphics, icons, or any other content that can be overlaid to the physical objects through the display of mobile device 830. As shown in FIG. 8D, a user may select the bundle 838 associated with the discount on a jacket. The selected bundle may be highlighted when a selection is received from the user.

Figure 8E:
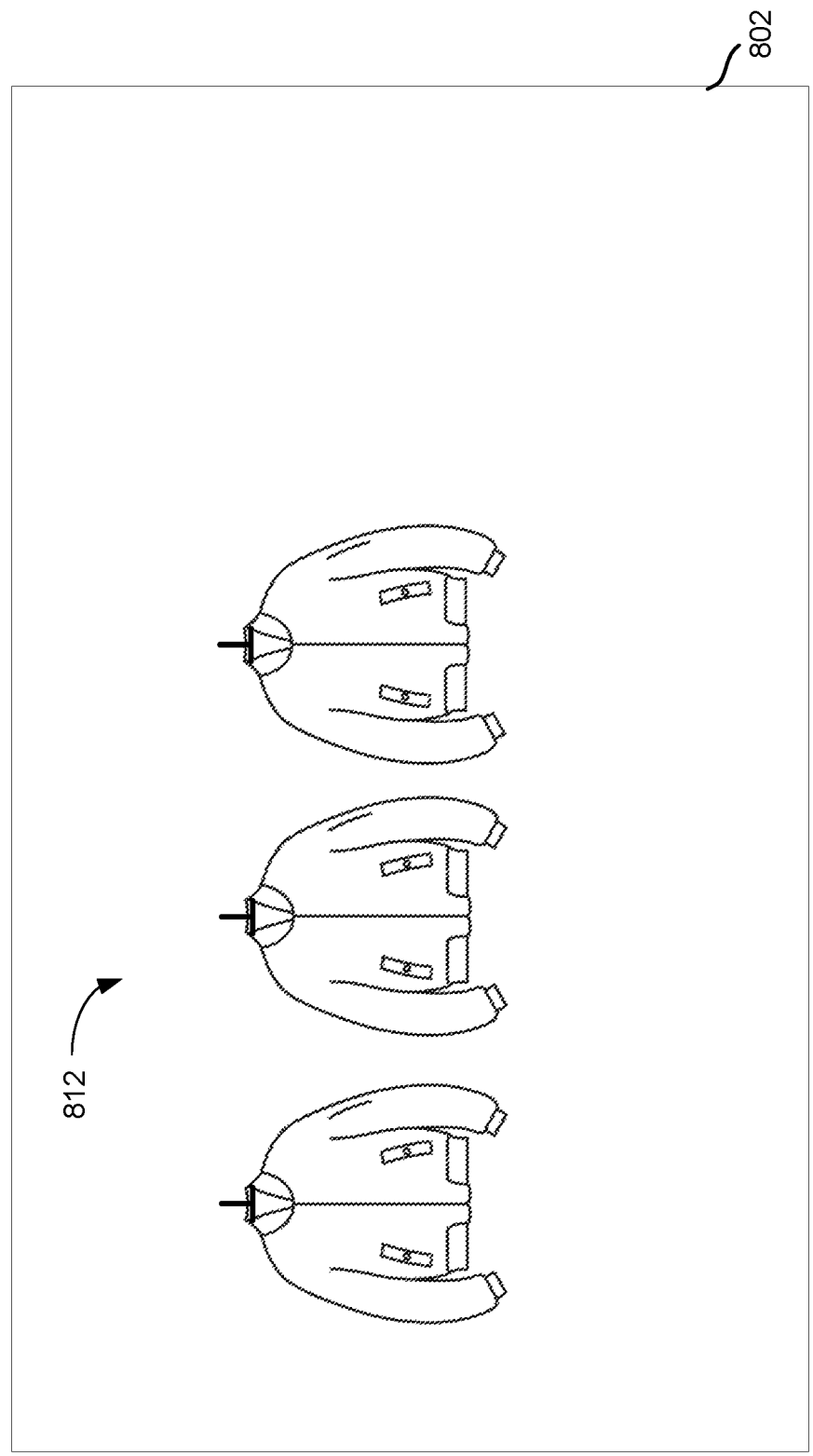
Figure 8F:
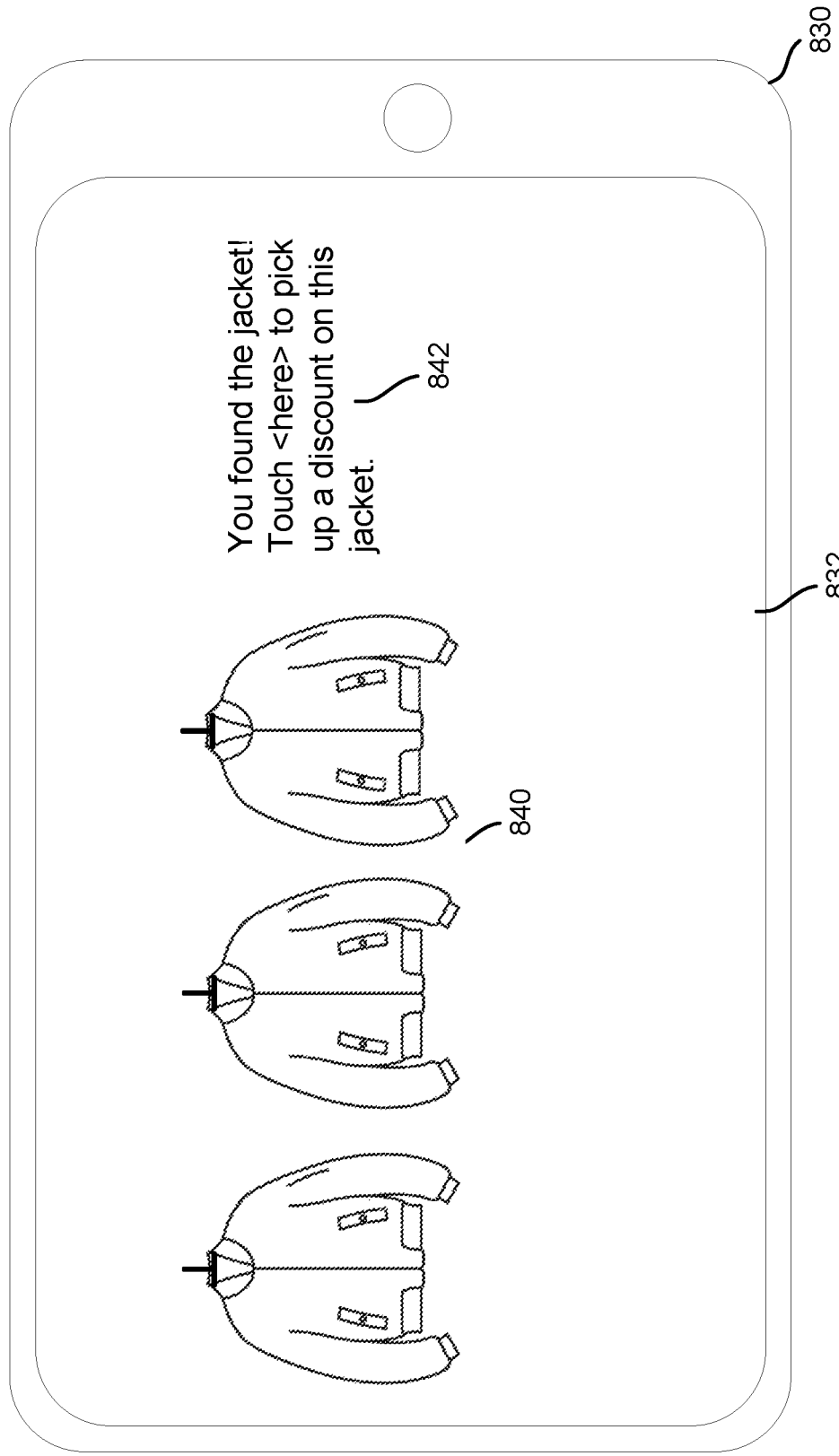

Returning to FIG. 8A, once the user selects the second product, indicators, text, graphics, or other content may be provided through the augmented reality functionality of a mobile application on a mobile device to direct the user to the second product. The virtual direction indicators 822, 824, 826 and 828 may appear within the space of store 800 when viewed through a mobile app which provides the augmented reality experience. Once the user arrives at aisle 802, the user may see the second product consisting of jackets, as illustrated in FIG. 8E. When displayed through mobile device 830, an image 840 of the jackets may be displayed next to additional content 842 which indicates that the user found the jackets as illustrated in FIG. 8F. The user can make a selection to select a discount for the particular jacket. The additional content provided as part of the augmented reality experience may include icons, text, and other content added to the display of mobile device 830.

Figure 9A:
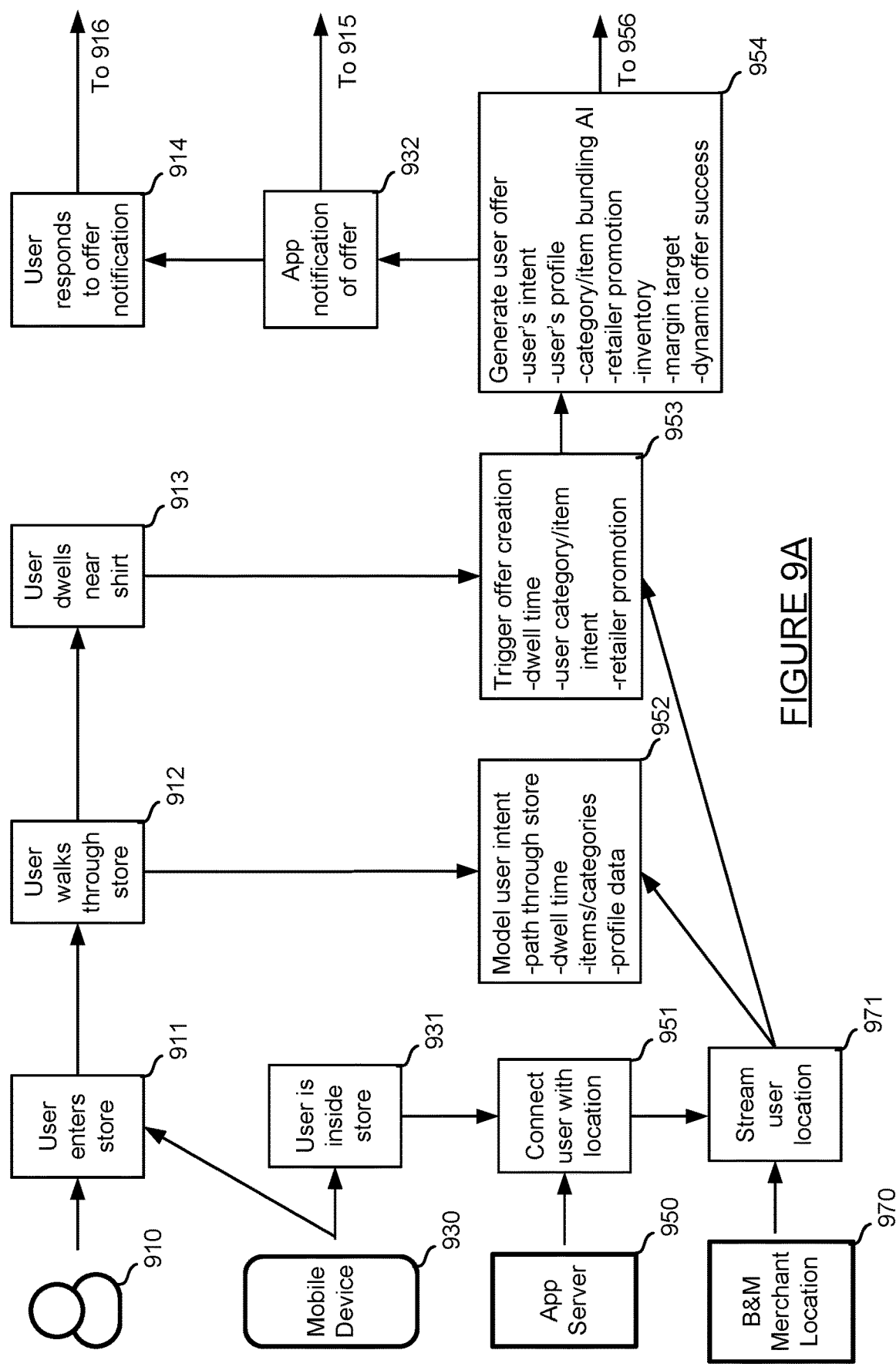
FIGS. 9A-9C illustrate a flowcharts of an exemplary user purchase experience.
Figure 9B:
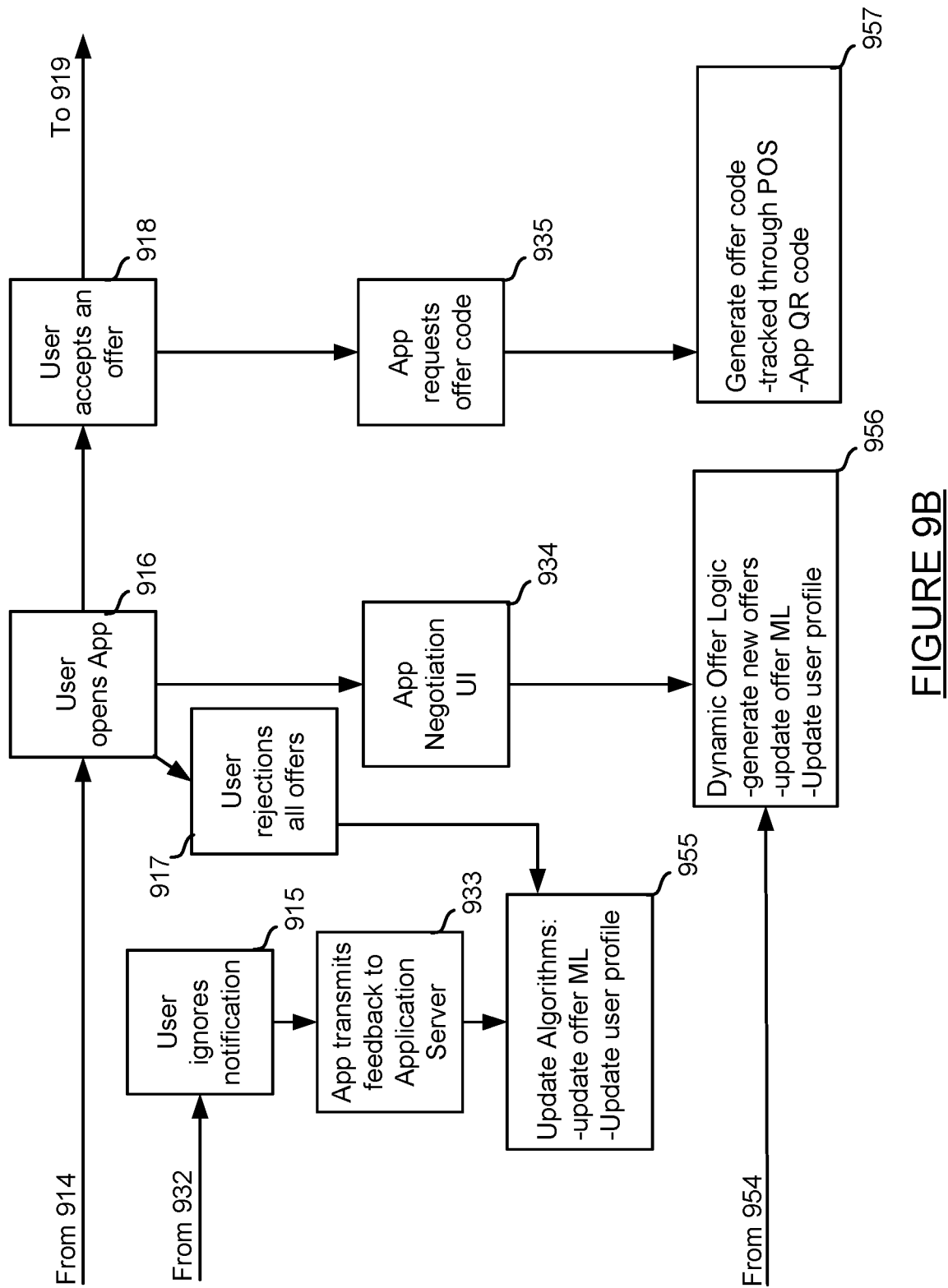
Figure 9C:
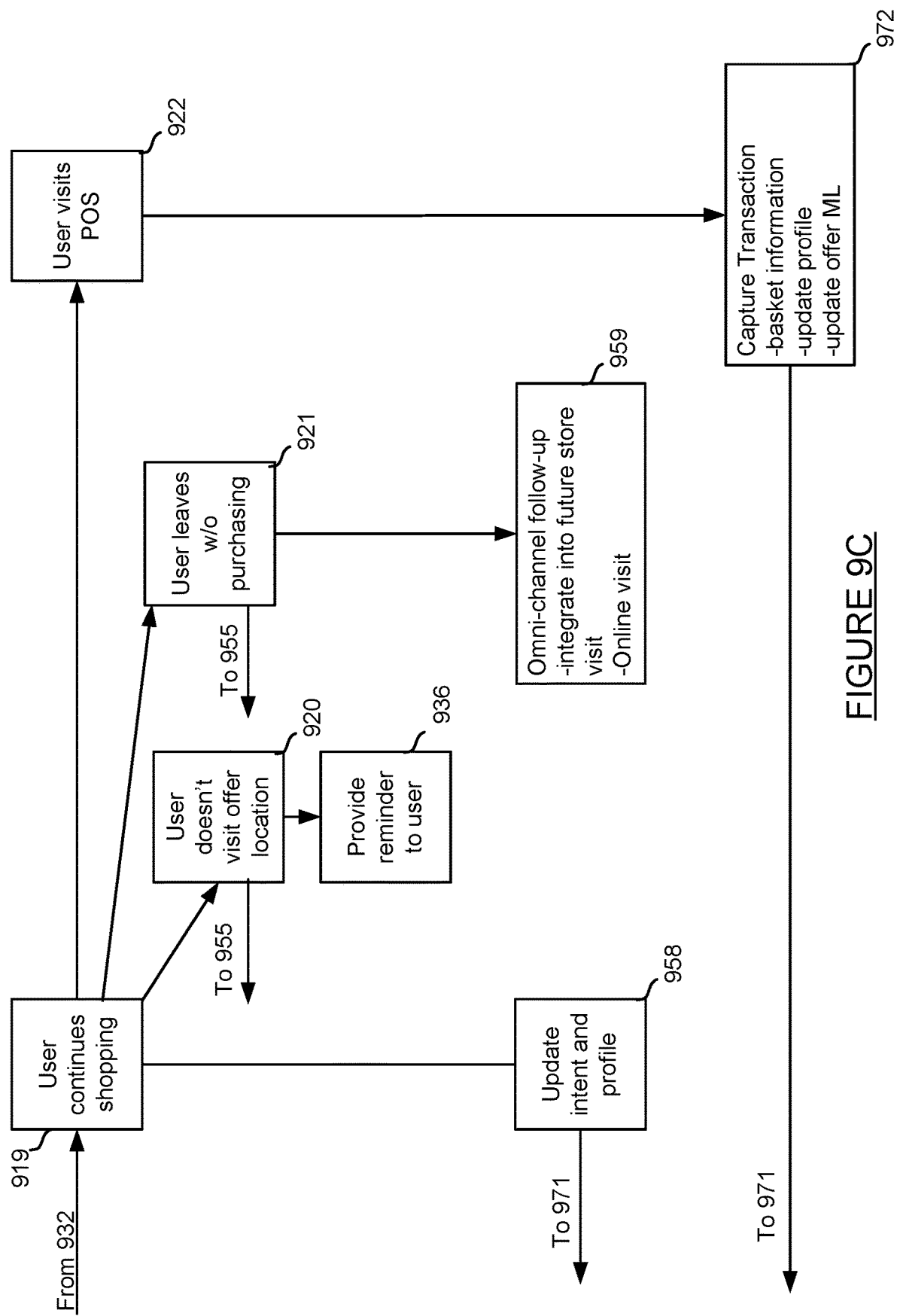

FIGS. 9A-9C illustrate a flowchart of an exemplary user purchase experience. The user purchase experience of FIGS. 9A-9C relates to a user that navigates a physical store with a mobile app on a mobile device. These are purchase experience steps for a user 910, mobile device 930, server 950, and merchant location 970. A user enters a store at step 911. Once the user enters the store, the mobile device detects that the user is inside the store from geographical data, and sends a message to have server 950 so that the app server can connect the user with the location at step 951. The merchant location may then stream the user location at step 971. The user location stream is used to update the model user intent at step 952 and trigger an offer creation once a user dwells near a product at step 953.

Returning to the user, the user walks in the store at step 912 and dwells near a T-shirt product at step 913. Walking through the store causes the model user intent to be updated while strolling you the T-shirt triggers an offer creation moment. The dwell time, user category an item intent, and retailer promotion are used to generate a user offer at step 954 by app server 950. The user offer is based on the user's intent, user's profile, category an item bundling artificial intelligence, retailer promotion and inventory data, the margin target and the dynamic offer success. After generating the user offer, the app is notified of the offer at step 712 and the user mobile device communicates the offer through the mobile app. If the user response to the offer notification at step 914. The user opens the app at step 916. User may then accept the offer at step 918, reject all the offers at step 917, or perform negotiation through user interface at step 934. If a user ignores notification provided on the mobile device, the app transmits feedback to the application server at step 933 and algorithms including models for the user profile and machine learning logic are updated at the app server at step 955. Similarly, if the user rejects all offers once they have opened the app, algorithms are also updated at step 955 accordingly. If the user negotiates one or more offers, dynamic offer logic is used to generate new offers, update user profile, and other update other machine learning logic.

If the user accepts an offer, the app can request and offer code at step 935. The offer code is then generated, and tracked through a point of service through the app provided QR code at step 957.

Continuing to FIG. 9C, if the user accepts the offer but continue shopping at step 919, user intent is updated along with the user profile step 958, and flow returns to step 971 or the user location is streamed. If, after the user continue shopping, the user doesn't visit the offer location, though continues to step 955 the algorithm and machine learning logic are updated. In some instances, a subsequent reminder may be provided to user at step 936. The user continues shopping and eventually leaves without purchasing the items, the algorithm and machine learning logic are updated at step 955, and the user data for the merchant is updated to integrate the offers into future store visits and online visits at step 959. If after continuing to shop, the user does visit a point of service, the transaction is captured, and the basket information is used to update the user profile and update machine language logic at step 972.

Figure 10:
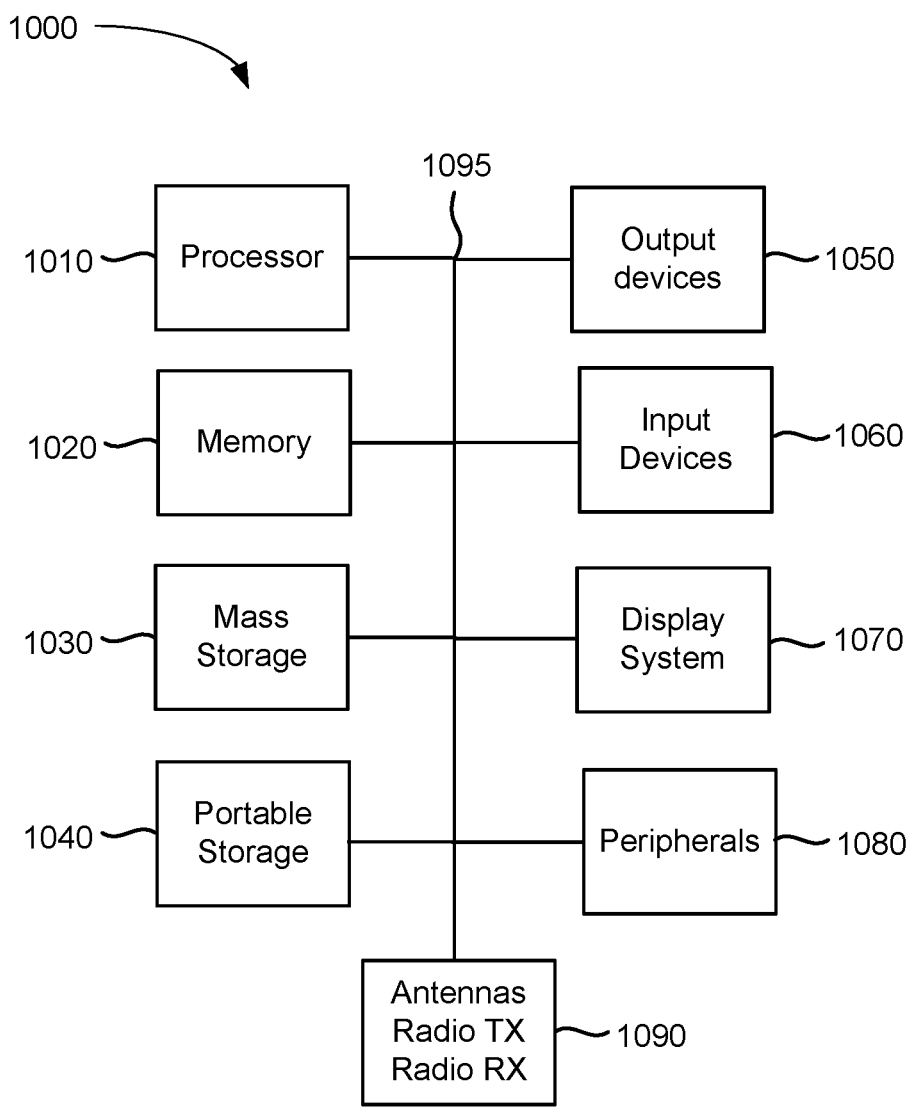
FIG. 10 is a block diagram of a computer system for implementing the present technology.

FIG. 10 is a block diagram of a computer system 1000 for implementing the present technology. System 1000 of FIG. 10 may be implemented in the contexts of the likes of computing device 110, mobile device 120, application server 140, and merchant servers 150-170.

The computing system 1000 of FIG. 10 includes one or more processors 1010 and memory 1020. Main memory 1020 stores, in part, instructions and data for execution by processor 1010. Main memory 1010 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable or remote storage device 1040, and display system 1070 may be connected via one or more input/output (I/O) buses.

Mass storage device 1030, which may be implemented with a magnetic disk drive, an optical disk drive, a flash drive, or other storage type, is a non-volatile storage device for storing data and instructions for use by processor unit 1010. Mass storage device 1030 can store the system software for implementing embodiments of the present technology for purposes of loading that software into main memory 1020.

Portable storage device 1040 operates in conjunction with a portable non-volatile storage medium, such as a compact disk, USB drive, external hard drive, digital video disk, magnetic disk, flash storage, etc. to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, a pointing device, such as a mouse, a trackball, stylus, or cursor direction keys, a touch screen display for receiving touch input, a microphone for receiving audio input, and one or more cameras for capturing gesture input. Additionally, the system 1000 as shown in FIG. 10 includes output devices 1050. Examples of suitable output devices include speakers, printers, network interfaces, image projectors, and monitors.

Display system 1070 may include a liquid crystal display (LCD), an LED display, or other suitable display device. Display system 1070 receives textual and graphical information, and processes the information for output to the display device. In some instances, a display within display system 1070 may also operate as an input device as discussed with respect to input devices 1060.

Peripherals 1080 may include any type of computer support device to add additional functionality to the computer system. For example, peripheral device(s) 1080 may include a modem or a router, speaker, or other peripheral.

When implementing a mobile device such as smart phone or tablet computer, the computer system 1000 of FIG. 10 may include one or more antennas, radios, and other circuitry 1090 for communicating over wireless signals, such as for example communication using Wi-Fi, cellular, or other wireless signals.

The components contained in the computer system 1000 of FIG. 10 can include a personal computer, hand held computing device, telephone, mobile computing device, workstation, server, minicomputer, mainframe computer, tablet computer, smart device (e.g., an Internet of Things or IoT device), or any other computing device. The computer can also include different bus configurations, networked platforms, multi-processor platforms, etc. Various operating systems can be used including Unix, Linux, Windows, Apple OS, Android, and other suitable operating systems, including mobile versions.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for providing an intelligent shopping experience, comprising:

receiving user merchant data for a user from a merchant server by an application server, the merchant data including, for a first user, user purchase history, user browser history, network site navigation data specific to the first user, desired frequency of the first user to receive offers, and product pricing parameters;

receiving product data from the merchant server by the application server, the product data including preferred customer for the product and related products for a product to be offered to the first user;

generating, by a bundle timing engine module executing on the application server within an application on the server, a bundling timing score related to whether to prepare a bundle for the first user at the current time, wherein each bundle offer includes an item of interest to the first user and a benefit, wherein the timing score is generated at least in part based on the received network site navigation data for the first user and a user intent vector for the first user, wherein the user intent vector is determined at least in part from the user purchase history included in the received user merchant data;

automatically preparing, by a bundle generator executing on the application server and based on the bundle timing score generated by the bundle timing engine, a first bundle for the user, the first bundle including the product, the product selected based at least in part the user merchant data including the user purchase history, the bundle timing score selected at least in part based on the desired frequency to receive offers, and the product data, the bundle generator automatically preparing the first bundle based on a machine learning model;

providing the first bundle to a user device associated with the first user by the application server;

receiving an indication by a shopping engine module executing on the application server and from the user device that first bundle is rejected;

automatically retrieving the most recent product data for the product in the first bundle in response to the rejection of the first bundle, the most recent product data associated with the product in the first bundle and the most recent merchant data specific to the first user and the seller of the first bundle, the most recent product data including pricing, sale, and related product data associated with the first product, the most recent product data having timing data occurring after the first bundle was provided to the first user, the most recent merchant data including sales parameter data having timing data occurring after the first bundle was provided to the user;

updating the machine learning model based on the indication received from the first user that the first bundle is rejected;

automatically generating, by the bundle generator executing on the application server, a second bundle for the first user based on the rejection of the first bundle, the bundle generator automatically preparing the second bundle based on the updated machine learning model, the second bundle including a change to one or more of the first products, second product, a first service, and a first discount, the second bundle generated based on the indication received from the user, the most recent product data associated with a timing that is after the first bundle was provided to the user, and the most recent merchant data specific to the user to whom the second bundle is offered and associated with a timing that is after the first bundle was provided to the user;

receiving a counter-offer from the user in response to providing the user with the second bundle;

determining whether the counteroffer received from the user is acceptable based on the updated machine learning model; and transmitting a response to the user to indicate whether the counter-offer is acceptable.

2. The method of claim 1, wherein determining the timing score includes loading a model with user merchant data, product data, and a user intent score.

3. The method of claim 2, wherein the user intent score is a vector generated from a product similarity score, the user proximity data, and timing data.

4. The method of claim 3, wherein the user proximity data includes user geographic data and user on-line navigation data.

5. The method of claim 1, wherein the benefit may include an offer for free shipping, shopping points with a merchant, a discount on an item related to the item of interest, a coupon with the merchant, or a discount or an offer for the next purchase.

6. The method of claim 1, wherein at least one of the one or more bundles is prepared from merchant data.

7. The method of claim 1, wherein updating the user merchant data includes indicating what bundle benefits the user selected and did not select.

8. The method of claim 1, wherein at least one of the pluralities of bundles includes a benefit provided by a second merchant.

9. The method of claim 1, further comprising negotiating a purchase of the item of interest and at least one bundle with the user, wherein negotiating includes:
receiving a counter-offer from a user in response to providing the user with one or more bundles on a real-time basis;
transmitting a response to the user to indicate whether the counter-offer is acceptable on a real-time basis; and
generating actions from the user either to continue negotiation, conclude a transaction or terminate the transaction, all on a real-time basis,
wherein the entire negotiation set is personalized and optimized and is only known and available to the user and may not be available to other users or to the same user at a different time.

10. The method of claim 1, wherein the one or more bundles are provided to a user at a physical location through a display having an interface, the interface providing an image of the physical location of merchant products being offered and an indicator of one or more of the one or more bundles.

11. The method of claim 1, wherein the one or more bundles are provided to a user through a network content page provided by a server associated with the merchant.

12. The method of claim 1, further including transmitting a request to the merchant server to update user merchant data for the user based on the indication received in response to the first bundle transmitted to the user's device.

13. The method of claim 1, wherein the indication includes a user preference for a service, a second product, a different quantity of the first product, or a different price for the first product bundled with the first product.

14. The method of claim 1, wherein in response to the rejection of the first bundle, automatically requesting input from a user regarding a desired change to the price, shipping, credits, bundle products, the second bundle automatically generated based on input received from the user in response to the requested input.

15. The method of claim 1, wherein automatically generating a first bundle and automatically generating a second bundle is an automated process that is trained using machine learning over time.

16. The method of claim 1, further comprising using analytics to select a featured product to include in the second bundle, the analytics based on one or more of geography, gender, and age.

17. A system for providing an intelligent shopping experience, the system comprising:
a processor;
memory;
one or more modules stored in memory and executable by the processor to receiving user merchant data for a user from a merchant server by an application server, the merchant data including, for a first user, user purchase history, user browser history, network site navigation data specific to the first user, desired frequency of the first user to receive offers, and product pricing parameters, receive product data from the merchant server by the application server, the product data including preferred customer for the product and related products for a product to be offered to the first user, generate, by a bundle timing engine module executing on the application server within an application on the server, a bundling timing score related to whether to prepare a bundle for the first user at the current time, wherein each bundle offer includes an item of interest to the first user and a benefit, wherein the timing score is generated at least in part based on the received network site navigation data for the first user and a user intent vector for the first user, wherein the user intent vector is determined at least in part from the user purchase included in the received user merchant data, automatically prepare, by a bundle generator executing on the application server and based on the bundle timing score generated by the bundle timing engine, a first bundle for the user, the first bundle including the product, the product selected based at least in part the user merchant data including the user purchase history, the bundle timing score selected at least in part based on desired frequency to receive offers, and the product data, the bundle generator automatically preparing the first bundle based on a machine learning model, provide the first bundle to a user device associated with the first user by the application server, receive an indication by a shopping engine module executing on the application server and from the user device that first bundle is rejected, automatically retrieve the most recent product data for the product in the first bundle in response to the rejection of the first bundle, the most recent product data associated with the product in the first bundle and the most recent merchant data specific to the first user and the seller of the first bundle, the most recent product data including pricing, sale, and related product data associated with the first product, the most recent product data having timing data occurring after the first bundle was provided to the first user, the most recent merchant data including sales parameter data having timing data occurring after the first bundle was provided to the user, update the machine learning model based on the indication received from the first user that the first bundle is rejected, automatically generate, by the bundle generator executing on the application server, a second bundle for the first user based on the rejection of the first bundle, the bundle generator automatically preparing the second bundle based on the updated machine learning model, the second bundle including a change to one or more of the first products, second product, a first service, and a first discount, the second bundle generated based on the indication received from the user, the most recent product data associated with a timing that is after the first bundle was provided to the user, and the most recent merchant data specific to the user to whom the second bundle is offered and associated with a timing that is after the first bundle was provided to the user, receive a counter-offer from the user in response to providing the user with the second bundle, determine whether the counteroffer received from the user is acceptable based on the updated machine learning model, and transmit a response to the user to indicate whether the counter-offer is acceptable.

18. A non-transitory computer readable storage medium having embodied thereon a program, the program being executable by a processor to perform a method for providing an intelligent shopping experience, the method comprising:
receiving user merchant data for a user from a merchant server by an application server, the merchant data including, for a first user, user purchase history, user browser history, network site navigation data specific to the first user, desired frequency of the first user to receive offers, and product pricing parameters;
receiving product data from the merchant server by the application server, the product data including preferred customer for the product and related products for a product to be offered to the first user;
generating, by a bundle timing engine module executing on the application server within an application on the server, a bundling timing score related to whether to prepare a bundle for the first user at the current time, wherein each bundle offer includes an item of interest to the first user and a benefit, wherein the timing score is generated at least in part based on the received network site navigation data for the first user and a user intent vector for the first user, wherein the user intent vector is determined at least in part from the user purchase included in the received user merchant data;

automatically preparing, by a bundle generator executing on the application server and based on the bundle timing score generated by the bundle timing engine, a first bundle for the user, the first bundle including the product, the product selected based at least in part the user merchant data including the user purchase history, the bundle timing score selected at least in part based on desired frequency to receive offers, and the product data, the bundle generator automatically preparing the first bundle based on a machine learning model;

providing the first bundle to a user device associated with the first user by the application server;

receiving an indication by a shopping engine module executing on the application server and from the user device that first bundle is rejected;

automatically retrieving the most recent product data for the product in the first bundle in response to the rejection of the first bundle, the most recent product data associated with the product in the first bundle and the most recent merchant data specific to the first user and the seller of the first bundle, the most recent product data including pricing, sale, and related product data associated with the first product, the most recent product data having timing data occurring after the first bundle was provided to the first user, the most recent merchant data including sales parameter data having timing data occurring after the first bundle was provided to the user;

updating the machine learning model based on the indication received from the first user that the first bundle is rejected;

automatically generating, by the bundle generator executing on the application server, a second bundle for the first user based on the rejection of the first bundle, the bundle generator automatically preparing the second bundle based on the updated machine learning model, the second bundle including a change to one or more of the first products, second product, a first service, and a first discount, the second bundle generated based on the indication received from the user, the most recent product data associated with a timing that is after the first bundle was provided to the user, and the most recent merchant data specific to the user to whom the second bundle is offered and associated with a timing that is after the first bundle was provided to the user;

receiving a counter-offer from the user in response to providing the user with the second bundle;

determining whether the counteroffer received from the user is acceptable based on the updated machine learning model; and transmitting a response to the user to indicate whether the counter-offer is acceptable.

19. The non-transitory computer readable storage medium of claim 18, wherein determining the timing score includes loading a model with user merchant data, product data, and a user intent score.

20. The non-transitory computer readable storage medium of claim 19, wherein the user intent score is a vector generated from a product similarity score, the user proximity data, and timing data.

21. The non-transitory computer readable storage medium of claim 20, wherein the user proximity data includes user geographic data and user on-line navigation data.

22. The non-transitory computer readable storage medium of claim 19, wherein the benefit or the bundle may include an offer for free shipping, shopping points with a merchant, a discount on an item related to the item of interest, or a coupon with the merchant or a discount or an offer for the next purchase.

23. The non-transitory computer readable storage medium of claim 19, wherein at least one of the one or more bundles is prepared from merchant data.

24. The non-transitory computer readable storage medium of claim 19, wherein updating the user merchant data includes indicating what bundle benefits the user selected and did not select.

25. The non-transitory computer readable storage medium of claim 19, wherein at least one of the pluralities of bundles includes a benefit provided by a second merchant.

* * * * *